(12) United States Patent
Youngwerth et al.

(10) Patent No.: US 10,688,611 B2
(45) Date of Patent: Jun. 23, 2020

(54) SYSTEM AND METHOD FOR STORING AND PROCESSING A VARIETY OF PART SHAPES USING ROBOTIC TENDING

(71) Applicant: VERSABUILT, INC., Boise, ID (US)

(72) Inventors: Albert James Youngwerth, Boise, ID (US); Shane Christopher Dittrich, Nampa, ID (US); Benjamin Thomas Blaine, Eagle, ID (US); Sean Gabriel Brown, Boise, ID (US); Eric James Lebsack, Boise, ID (US)

(73) Assignee: VersaBuilt, Inc., Boise, ID (US)

( * ) Notice: Subject to any disclaimer, the term of this patent is extended or adjusted under 35 U.S.C. 154(b) by 239 days.

(21) Appl. No.: 15/492,924

(22) Filed: Apr. 20, 2017

(65) Prior Publication Data

US 2017/0216984 A1     Aug. 3, 2017

Related U.S. Application Data

(63) Continuation of application No. 14/265,198, filed on Apr. 29, 2014, now Pat. No. 9,656,395.

(Continued)

(51) Int. Cl.
*B23Q 3/06* (2006.01)
*B23Q 7/04* (2006.01)
(Continued)

(52) U.S. Cl.
CPC .............. *B23Q 7/043* (2013.01); *B23Q 1/01* (2013.01); *B23Q 3/066* (2013.01); *B23Q 7/04* (2013.01);
(Continued)

(58) Field of Classification Search
CPC . B23Q 1/01; B23Q 3/066; B23Q 7/04; B23Q 7/043; B23Q 3/15506;
(Continued)

(56) References Cited

U.S. PATENT DOCUMENTS 530,733 A * 12/1894 Tower .................. B25B 1/2436
269/261
3,565,417 A * 2/1971 Degle .................. B25B 1/2473
269/284

(Continued)

FOREIGN PATENT DOCUMENTS

CN       101907440 A    12/2010
CN       102331742 A     1/2012

(Continued)

*Primary Examiner* — Joseph J Hail
*Assistant Examiner* — Arman Milanian

(57) ABSTRACT

A system and method for using a robotic arm and a part gripping jaw to tend a CNC machine. A robotic arm picks up a part gripping jaw and used the jaw to grip a part, and moves the part into a vise in the CNC machine. The part gripping jaw has features which the vise engages, and secures the part in the part gripping jaw for processing in the CNC machine. The system and method includes a novel racking system, robotic end of arm tool, jaw grippers and vise system. The jaw grippers that hold the part are moved from the rack system, with the part to be processed, by the robot, to the vise where the vise uses the jaw grippers to secure the part for processing. After the part is processed, the robot removes the part from the vise with the jaw grippers and stores the part back into the rack system using the jaw grippers.

14 Claims, 15 Drawing Sheets

Related U.S. Application Data

(60) Provisional application No. 61/816,927, filed on Apr. 29, 2013.

(51) Int. Cl.
    *B25J 15/04*     (2006.01)
    *B23Q 1/01*     (2006.01)

(52) U.S. Cl.
    CPC ..... *B25J 15/0475* (2013.01); *Y10T 29/49998* (2015.01)

(58) Field of Classification Search
    CPC .. B25J 15/0475; B65H 29/02; Y10S 294/902; Y10S 483/901; Y10T 29/49998
    See application file for complete search history.

(56) References Cited

U.S. PATENT DOCUMENTS

| | | | |
|---|---|---|---|
| 4,403,801 A | 9/1983 | Huff et al. | |
| 4,437,654 A * | 3/1984 | Chiappetti | B25B 1/103 269/283 |
| 4,458,566 A | 7/1984 | Tajima | |
| 4,555,844 A | 12/1985 | Palfery et al. | |
| 4,599,759 A | 7/1986 | Price et al. | |
| 4,637,121 A * | 1/1987 | Wortmann | B23K 11/318 29/26 A |
| 4,644,636 A * | 2/1987 | Link | B23B 31/16279 483/20 |
| 4,797,989 A * | 1/1989 | Cherko | B23Q 3/15526 198/345.3 |
| 4,798,371 A * | 1/1989 | Wallisser | B25B 1/2452 269/283 |
| 4,884,678 A | 7/1989 | Schenk | |
| 4,894,103 A | 1/1990 | Bailey | |
| 4,949,444 A | 8/1990 | Kojima et al. | |
| 5,044,063 A * | 9/1991 | Voellmer | B23Q 3/15553 294/86.4 |
| 5,060,920 A | 10/1991 | Engibarov | |
| 5,149,072 A | 9/1992 | Sartorio et al. | |
| 5,186,593 A | 2/1993 | Tsukada et al. | |
| 5,256,128 A | 10/1993 | Neumann | |
| 5,309,368 A | 5/1994 | Chern | |
| 6,170,813 B1 * | 1/2001 | Bowers | B25B 1/2452 269/282 |
| 6,293,750 B1 | 9/2001 | Cohen et al. | |
| 6,357,994 B1 | 3/2002 | St. Onge | |
| 6,371,717 B1 | 4/2002 | Grams et al. | |
| 6,516,935 B1 | 2/2003 | McLennan | |
| 6,557,235 B1 | 5/2003 | Katz et al. | |
| 6,957,809 B1 * | 10/2005 | Ferrara | B25B 1/2405 269/282 |
| 7,651,453 B2 * | 1/2010 | Terazono | B23B 31/39 279/901 |
| 8,215,624 B2 | 7/2012 | Tomioka et al. | |
| 8,365,386 B2 * | 2/2013 | Vontz | B25J 15/0052 228/212 |
| 2002/0117380 A1 | 8/2002 | Downs et al. | |
| 2010/0243501 A1 | 9/2010 | Monti | |
| 2010/0282037 A1 | 11/2010 | Fujimoto et al. | |
| 2011/0277602 A1 * | 11/2011 | Kobayasi | B23B 31/16279 82/117 |
| 2013/0154293 A1 * | 6/2013 | De Koning | B25J 15/02 294/207 |
| 2013/0245823 A1 | 9/2013 | Kimura et al. | |
| 2014/0246824 A1 * | 9/2014 | Fiegener | B25B 1/2478 269/265 |

FOREIGN PATENT DOCUMENTS

| | | | |
|---|---|---|---|
| DE | 2607029 A1 | 8/1977 | |
| DE | 3513893 A1 * | 10/1986 | ............ B25J 15/026 |
| DE | 3731471 A1 * | 4/1989 | ......... B25J 15/0206 |
| DE | 102005052627 A1 * | 5/2007 | ......... B25J 15/0475 |
| DE | 102006003985 A1 | 7/2007 | |
| DE | 202011052430 U1 * | 3/2013 | ......... B25J 15/0475 |
| EP | 0155362 A1 * | 9/1985 | ......... B25J 15/0475 |
| EP | 0185286 A1 | 6/1986 | |
| EP | 0973039 A2 | 1/2000 | |
| EP | 2607029 A1 | 6/2013 | |
| FR | 2566635 A1 | 1/1986 | |
| FR | 2586908 A1 | 3/1987 | |
| JP | 2065986 A2 | 3/1990 | |
| JP | 2018158405 A * | 10/2018 | ......... B25J 15/0475 |
| WO | 199929467 A2 | 7/1999 | |
| WO | 2010035655 A1 | 4/2010 | |

* cited by examiner

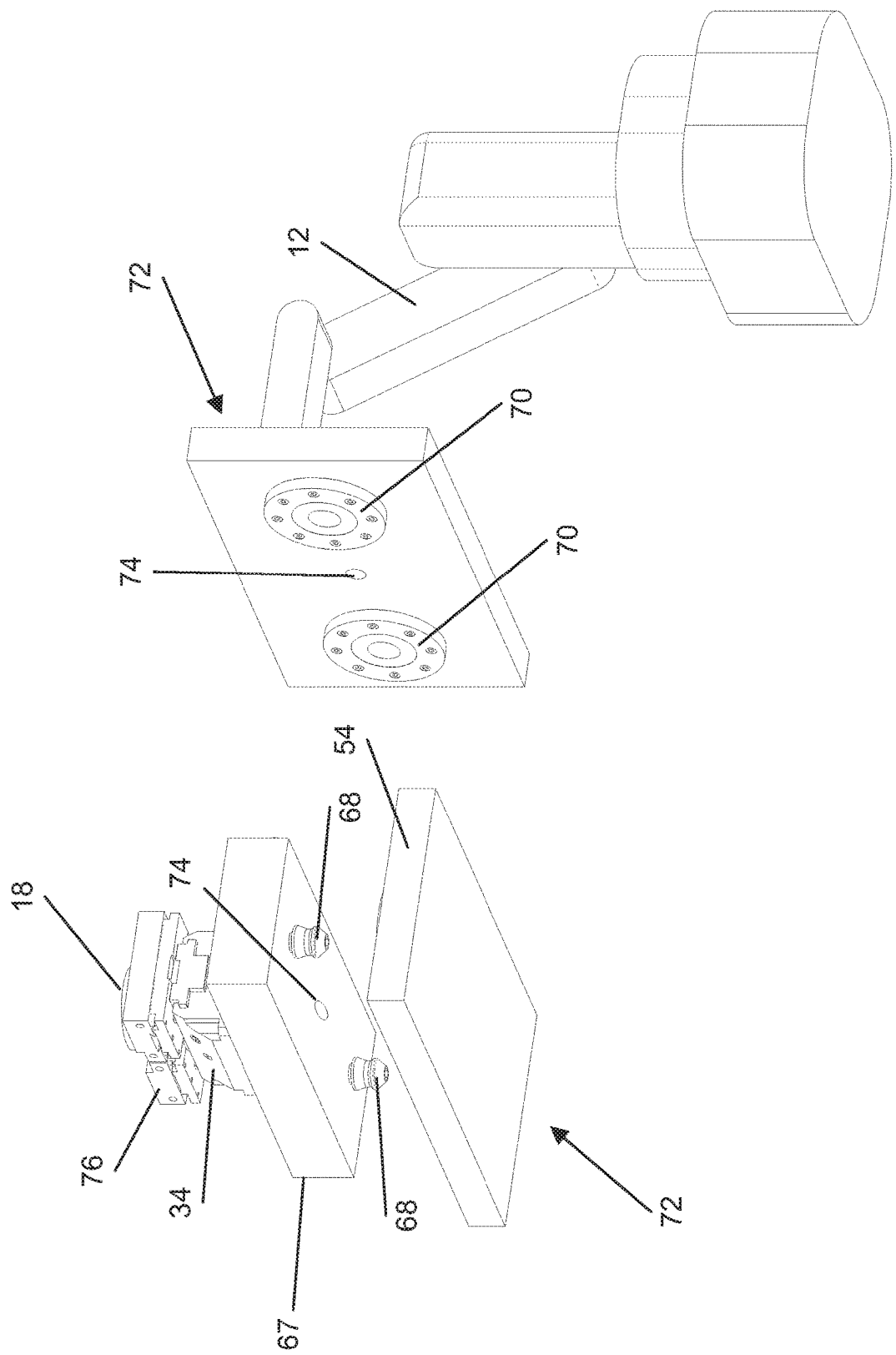

SYSTEM AND METHOD FOR STORING AND PROCESSING A VARIETY OF PART SHAPES USING ROBOTIC TENDING

PRIORITY/CROSS-REFERENCE TO RELATED APPLICATIONS

This continuation application claims the benefit of U.S. application Ser. No. 14/265,198, filed Apr. 29, 2014, which claims the benefit of U.S. Provisional Application No. 61/816,927, filed Apr. 29, 2013, the disclosures of which are incorporated by reference.

TECHNICAL FIELD

The presently disclosed and claimed inventive concept(s) generally relates to robotic manufacturing and CNC machines, and more particularly to a robotic tender for a CNC machine.

BACKGROUND

This invention relates to robotic systems. More specifically a robotic system capable of grasping a part from a part racking area, presenting the part to an operation area, optionally repositioning and re-presenting the part to the operation area one or more times and then storing the part back to the racking area.

Robotic systems for part handling are well known in the art. Such robotic systems are typified by the IRB-140 by ABB Robotics. The IRB-140 is a six axis robotic arm. For part handling applications, the IRB-140 is typically configured with an End of Arm Tool (EOAT) mounted to the end of the robot's arm. The EOAT is operable to grab a part and move it from one location to another.

Because robots can move unexpectedly in a rapid, powerful fashion, protective guarding is typically provided. Guarding around the robot prevents a person from entering an area where the robot might strike and injure the person. Typically, access doors into the guarded area are provided and equipped with sensors such that when an access door is open, the robot is prevented from moving.

A common application for robot part handling is CNC Machine tending. CNC Machines typically cut material from a part to form the part into a new shape. Parts can be of an almost infinite variety of shapes and sizes. Parts are typically placed into and clamped securely by a vise or other means to secure the part in the CNC Machine. A vise will typically have provisions for replaceable, machinable jaws. The vise jaws will typically be machined to match the shape of the part as it will be held for a first machine operation. In many cases, the part will need a second machine operation. For the second operation, the part is typically held in the vise using the face of the part that was machined in the first operation. Because the part shape typically changes after the first operation, a second set of jaws, matching the shape of the part after the first operation, held in a second vise, will typically be needed to hold the part for the second operation.

In a CNC Machine tending application, parts are typically placed into a part racking area, within the guarded area of the robot, through an access door. When the racking area has been filled with parts and the access doors secured, the operator will signal the system to start. The part racking area is typically designed to locate each part in a precise location. The robot must be programmed to precisely locate each part in the rack for pickup. The robot's EOAT is typically designed to match the shape of the part so the part can be precisely located for pickup from the part racking area and placed precisely into the CNC Machine vise. In many cases, the EOAT the robot used to place the part for the first operation is not suitable for moving the part from the first operation to the second operation. Additionally, in many cases, a third EOAT must be used by the robot to move the part out of the second operation fixture and back to the part rack. Each robot EOAT is typically custom engineered and typically has a much higher cost than the vise jaws used in the CNC machine. If a new part having different dimensions is introduced into the CNC Machine tending application, new part racking, robot programming, EOATs and CNC machine vises must be engineered.

To manage multiple EOATs, robots are typically configured in one of two ways: multiple EOATs attached to the end of the robot arm or a robot EOAT changer. Multiple EOATs have the disadvantage of adding weight to the end of the robot arm. The extra weight may necessitate a larger, more expensive robot. Robot EOAT changers are lighter in weight but are typically a more costly alternative.

Implementing a robotic CNC Machine tending application can be very expensive. Robotic costs include fencing, doors, and other safety equipment; part racking, multiple EOATs, tool changers, and other equipment needed to hold, pick and place parts. The cost of the robotic equipment is typically similar in cost to the cost of a CNC Machine and vises. However, the cost of engineering to design part racking, EOATs, guarding and programming of the robotic system is typically far higher than the cost of engineering to design and program a human loaded part. Robotics engineers typically cost two to four times as much as CNC Machine programmers.

For a typical CNC Machine tending application, robotic engineering and implementation expenses for an entire system with a single part might range from $20,000 to more than $100,000. Whereas CNC Machine engineering and implementation expense for vise jaws and a single part are typically less than $1,000. Adding a new, dissimilar part to an existing robotic tending application may incur new robotic engineering costs for part racking, EOATs and robotic programming of $5,000 to more than $100,000. In many cases, the setup time to switch between one part and another part in a robotic tending application could take many hours of work by a robotics engineer and be cost prohibitive. Whereas in a modern CNC Machine, setup time to switch between one part and another part is often less than one hour and can be performed by inexpensive trained operator labor.

In some applications, a human cannot replace a robot because of speed, precision or safety requirements. In CNC Machine tending applications, this is not typically the case. CNC Machine tending is typically performed by humans. When making a decision about using a human or a robot in a CNC Machine tending application, cost and return on investment is almost always the key decision point. Yet for most applications, the robotic engineering costs are too high to amortize over the expected life of the part.

Therefore a need exists for a robotic system that can tend a wide variety of parts with minimal engineering costs and a minimum of setup costs for each part to be run. Because most manufacturing facilities employ relatively low-cost CNC Machine programmers and not robotics engineers, the robotic system should be easily adaptable to a wide variety of parts by a CNC Machine programmer with no robotic programming necessary.

An alternative Robotic tending system incorporates a rack system holding parts attached to pallets. The Erowa Robot Compact (ERC) is typical of these systems. Instead of racks holding work pieces, the ERC stores pallets in the system's racks. The operator affixes each part to a pallet and places the pallet into the ERC. All pallets are stored in precise locations in the rack system and have a common interface to the ERC's EOAT. With pallet locations pre-defined and no need to change the EOAT to handle different parts, the ERC overcomes the primary disadvantages of robot tending systems that pick parts directly off of a shelf: no need to create a custom EOAT for each part and no custom programming required to tend different parts into a CNC machine.

However, there are at least two disadvantages to such systems: the cost of labor required to load each part onto a pallet and the cost and storage requirements of the pallets. Pallets typically incorporate custom fixturing to secure each part to the pallet. The cost of each pallet incorporating custom fixturing can range from $250 to more than $1,000. Most parts typically require two different machining operations with two different types of fixtures for each operation. For a system that holds 50 pallets, the cost of fixturing to configure the system to tend 50 of a single part that requires two operations can range from $25,000 to more than $100,000 compared to $1,000 for a typical human loaded part. Furthermore, in this type of system, the operator must load and secure each part to a pallet for machining and then unsecure and unload each part when it is finished whereas in a traditional robot tending system where the robot picks up parts, the operator needs only to place the part in the rack for machining and pull the part out of the rack after machining.

Therefore a need exists for a robotic system that can tend a wide variety of parts with minimal engineering costs and a minimum of setup costs for each part to be run. The labor required to load and unload the system should be minimal. Because most manufacturing facilities employ relatively low-cost CNC Machine programmers and not robotics engineers, the robotic system should be easily adaptable to a wide variety of parts by a CNC Machine programmer with no robotic programming necessary.

SUMMARY OF THE DISCLOSURE

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept(s) in any way.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

Disclosed is a method of using a robotic tender for tending a CNC machine. What is meant by tending is feeding parts to be processed into the CNC machine, where they are processed. "Processing" can mean a number of steps which are typically done in the manufacturing of parts. Processing can include machining, drilling, EDM (Electric Discharge Machining), grinding, welding, sanding, polishing, and other mechanical processes which are performed by a CNC machine.

The disclosed method includes the steps of providing a part gripping jaw, which is designed to grip a part. The part gripping jaw has at least a left jaw and a right jaw and the two jaws spread apart and close together. Some devices in the industry include grippers with three parts, and such a three part jaw is within the inventive concepts herein disclosed. Defined in the part gripping jaw in either or both of the left or right jaw are various profiles which are provided to enable the jaws to grip a part. If the part is a round part, the profiles provided might be two recessed ring shaped structures which would fit around the outside diameter of the round part. A round part could also be gripped by two protruding posts on one jaw which operate in opposition to two protruding posts on the other jaw. Besides having gripping profiles to grip the outside diameter of a part, some parts will be better gripped using the inside features of a part, and inside diameter gripping profiles may also be provided. The part gripping jaw has a first side and a second side, with the gripping profiles in the first side, which could be considered the top side of the part gripping profiles.

The method includes the step of providing a robotic arm with an End of Arm Tool (hereinafter referred to as an EOAT). The EOAT is configured to engage the left and right jaws of the part gripping jaw. It is also capable of moving the left and right jaws together or apart in order to grip the part to be processed in the part gripping profile. Specifically, the EOAT is built to engage, squeeze, and release the jaws of the part gripping jaws. The EOAT may be prongs or forks which fit into recesses in each of the jaws, such as two forks on each side of the EOAT, one fork, or by the use of other structures which grip the left and right jaws and enable the EOAT to move the left and right jaws apart or together. If the EOAT uses forks to engage the part gripping jaw, the part gripping jaw is provided with internal channels into which the forks of the EOAT fit.

The next step in the method is placing a part to be processed in the CNC machine in a position-for-pickup by the robotic arm with its attached EOAT. The part can be placed in position such as in a rack in which dozens of such parts are placed, or in a single position which is restocked automatically. If the robotic arm knows the position of each of the parts in the rack, it can pick up each of the parts in turn and move it to the CNC machine for processing. In the case of a single position, it can be restocked by conveyor belt for instance.

The next step in the method is engaging the part gripping jaw with the EOAT. After engagement, the left and right jaws are moved either apart or together in order to grip the part. The jaws are moved together if the part is to be gripped on the outside surface of the part. The jaws move apart if the part is to be gripped on inside surfaces of the part.

The next step is placing the part gripping jaw in an inverted position over the part in the position-for-pickup. The next step is moving the left and right jaws together or apart in order to grip the top section of the part, moving from an engagement to a securing position. The jaws would be moved together to grip the outside surface of the part, and they would be moved apart to grip an inside surface of the part, either of which can be an engagement position. Once the part is gripped by the part gripping jaw, the next step is lifting the part by movement of the robotic arm. Although this step refers to placing the part gripping tool on the part from the top, it is within the inventive concept for the part to be held by the top, and the part gripping jaw to grip the bottom of the part, in which case the part gripping jaw would not be inverted.

The next step is moving the part secured in the part gripping jaw to a vise inside the CNC machine, which can be on a CNC table within the CNC machine. The next step is clamping the part gripping jaw, with the part still in the part gripping jaw, by activation of the vise. Just like the EOAT, the vise is capable of engaging, squeezing, and releasing the part gripping jaw. The vise can include jaws which move to secure the part gripping jaws in place by gripping projections, ridges, dovetails, or rails. The next step is disengaging the EOAT from the part gripping jaw, and removing the EOAT from the CNC machine. The last step in this particular sequence is processing the part in the CNC machine.

Additional steps can be performed after the above sequence of steps, including after processing the part in the CNC machine, engaging the part gripping jaw in the vise, with the EAOT, securing the part gripping jaw with the EOAT, and disengaging the vise. The next step is removing the part gripping jaw and the now finished part from the CNC machine, using the robot arm and the EOAT. Then placing the finished part in a finished part position, which could be in a vise, on a table, or in a rack. The next step is disengaging the part gripping jaw from the part.

Another embodiment of the method is involving steps which come after the part is processed in the CNC machine. At that time, a method can include using the EOAT to engage and secure a second part gripping jaw. Since the shape of the part may have changed during processing, a second part gripping jaw may be required to grip the new shape of the part. The next step is moving the second part gripping jaw into engagement with the part in the vise. The next step is disengaging the vise to release the part gripping jaw and the attached part. The next step is engagement and securing the second gripping jaw onto the part. The next step is moving the second part gripping jaw and the attached part into engagement with a second vise, with a bottom side of the second part gripping jaw configured to engage and be secured in the second vise by the same features as found in the first part gripping jaw and the first vise. During this gripping and moving step, the second part gripping jaw would likely be inverted to present the bottom of the part gripping jaws to the second vise for attachment. The next step is activating the second vise, and removing the EOAT from the second part gripping jaw, and processing the part while being held in the second part gripping jaws and in the second vise.

The method includes providing the part gripping jaw with a vise engagement profile, and providing the vise with a jaw engagement profile. These profiles are corresponding features, meaning that where one of these surfaces has a projection, the other surface has a depression, so the profiles fit together and provide a solid connection between the jaws and the vise. Useful engagement profiles can include peaks and valleys, tongue and grooves, and intermeshing gear like projections.

The step of securing the part gripping jaws in the vise can include providing interlocking projections on either part, having angled surfaces which are positioned to be pressed together when the vise jaws tighten. These projections can be on the bottom side of the part gripping jaw, and can be one or more locating rails with angled surfaces which are engaged by angled surfaces on the vise jaws, pressing the part gripping jaw firmly into place on the vise top surface.

As well as the method described above, the disclosed technology can include the method of providing a plurality of part gripping jaws in a position-for-pickup by the EOAT, with each part gripping jaw having a part in the part gripping jaw, ready for engagement and pickup by the EOAT.

Another embodiment of the disclosed technology is a system for robotically processing parts using a robotic arm for tending a CNC machine. The system includes a CNC machine with an electronically activated part vise inside the enclosure of the CNC machine. The part vise opens and closes to secure the part within the CNC machine. Once a part is secured the CNC can move over the part in order to perform the processes indicated for the part. The CNC machine can perform any number of standard processes, including machining, polishing, cutting, drilling, removing material in various mechanical ways, and other typical CNC functions.

The system includes a part pickup position, which is indexed so that the robotic arm can pick up the part without human intervention. The part position may be a rack in which a large number of parts are placed ready for pickup, with each position on the rack indexed for accurate pickup by the robotic arm. The part position may also be a single position, which could be supplied by parts automatically such as by a conveyor belt which feeds a part into position as soon one part is lifted out of position.

The robotic arm includes an End of Arm Tool (EOAT) which is attachable to the robotic arm. The EOAT is configured to engage a part gripping jaw and to use the part gripping jaw to pick up parts from the part position-for-pickup. The EOAT engages a part gripping jaw which is utilized to pick up the part. The part gripping jaw has at least two, and sometimes three jaws and they close on a part and secure the part in three axes. The part gripping jaw has a left and a right jaw with the jaws having a first and a second side. Each of the jaws has a part gripping profile on the first or second side. The part gripping profile is configured for a particular part so that it may be picked up by the part gripping jaws. For instance, the jaws can tighten on a part to grip the outside surfaces of the part, and for that purpose would have a profile which fits the circumference of a round part or with posts which engage a round part for pickup. The part could also have other positions for pickup such as the inside diameter of a tube, or holes or spokes which are drilled in the part. For some of these shapes of parts, the jaws would engage the part by expanding and gripping such as to grip the inside of a hollow tube shaped part.

The part gripping jaw has a vise engagement profile on the bottom or second side, which has projections which interfit with corresponding depressions (or vice versa) on the top surface of the vise. The part gripping jaw has a third side, configured to engage the EOAT. The EOAT and the part gripping jaw can engage by the use of forks fitting in internal recesses, for example two forks on the EOAT for each of two jaws on the part gripping jaws, with each of the jaws having two internal recesses for engaging the two forks. The EOAT engages the part gripping jaws by engaging, squeezing, and later releasing the part gripping jaws.

The system as described is able to move the end of arm tool over a part in an inverted position, open or close the jaws to prepare to engage the part, lower the part gripping jaw onto the part, grip the part by engaging the left or right jaw, lift the part, move the part by the robot arm and place the part in the vise of the CNC machine. The part gripping jaw would typically be inverted to grip the part then it would reverse 180 degrees. The typical part gripping jaw pickup would be inverted over the part, and then it would engage the part then lift it and move it into position over the vise and place it in the part. The vise would grip the part, the part gripping jaw would release the part and the arm would move away from the vise while the CNC device performed its operation on the part. The advantage of this system is that the movement of the robotic arm could be programmed by a CNC programmer, and not require the services of a robotic engineer programmer. This configuration also has the advantage of using one pair of part gripping jaws in order to handle any number of parts. After the part had been processed in the CNC machine the same part gripping jaw would be utilized to pick the part up and move it out of the CNC machine into another position for further processing. If necessary, the robot arm could disengage the part gripping jaw which fit the original part shape, and could engage a second part gripping jaw which had features for gripping the part after it had been processed in the CNC machine. By this way two part gripping jaws could be utilized to process any number of parts, without the need for human activity to engage the parts on the EOAT or on the robotic arm or on the vise in the CNC machine.

The part gripping jaw includes a vise engagement surface and the vise includes a jaw engagement surface, in which projections in one fit in depressions in the other, to more securely affix the part gripping jaw to the vise. One form of engagement surface is in the form of gear-like teeth which interfit with the reverse shape in the opposite surface. The vise also includes jaws, and the part gripping jaws has one or more projections or locating rails. The jaws have an angled surface, and the projections or rails have an oppositely angled surface, so that when the vise jaws press against the projections or locating rails, the part gripping jaws are pressed into the top surface of the vise.

BRIEF DESCRIPTION OF THE DRAWINGS

FIG. 16 is a view of a vise that is configured to be engageable and movable by a robot arm and EOAT and configured to be engageable with a CNC table.

DETAILED DESCRIPTION OF THE EXEMPLARY EMBODIMENTS

Reference throughout this specification to "an embodiment," or similar language means that a particular feature, structure, or characteristic described in connection with the embodiment is included in at least one embodiment of the present invention. Thus, appearances of the phrases "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of the embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention provides for a method and system of Improved Robotic Tending System (IRTS), adaptable to process a wide variety of parts, with no robotic programming required and with substantially reduced engineering costs associated with each part adapted to the system. The IRTS can typically be configured to tend a wide variety parts by a CNC Machine programmer, leveraging the CNC Machine programmer's existing skills and without any special robotic skills or training.

Figure 1:
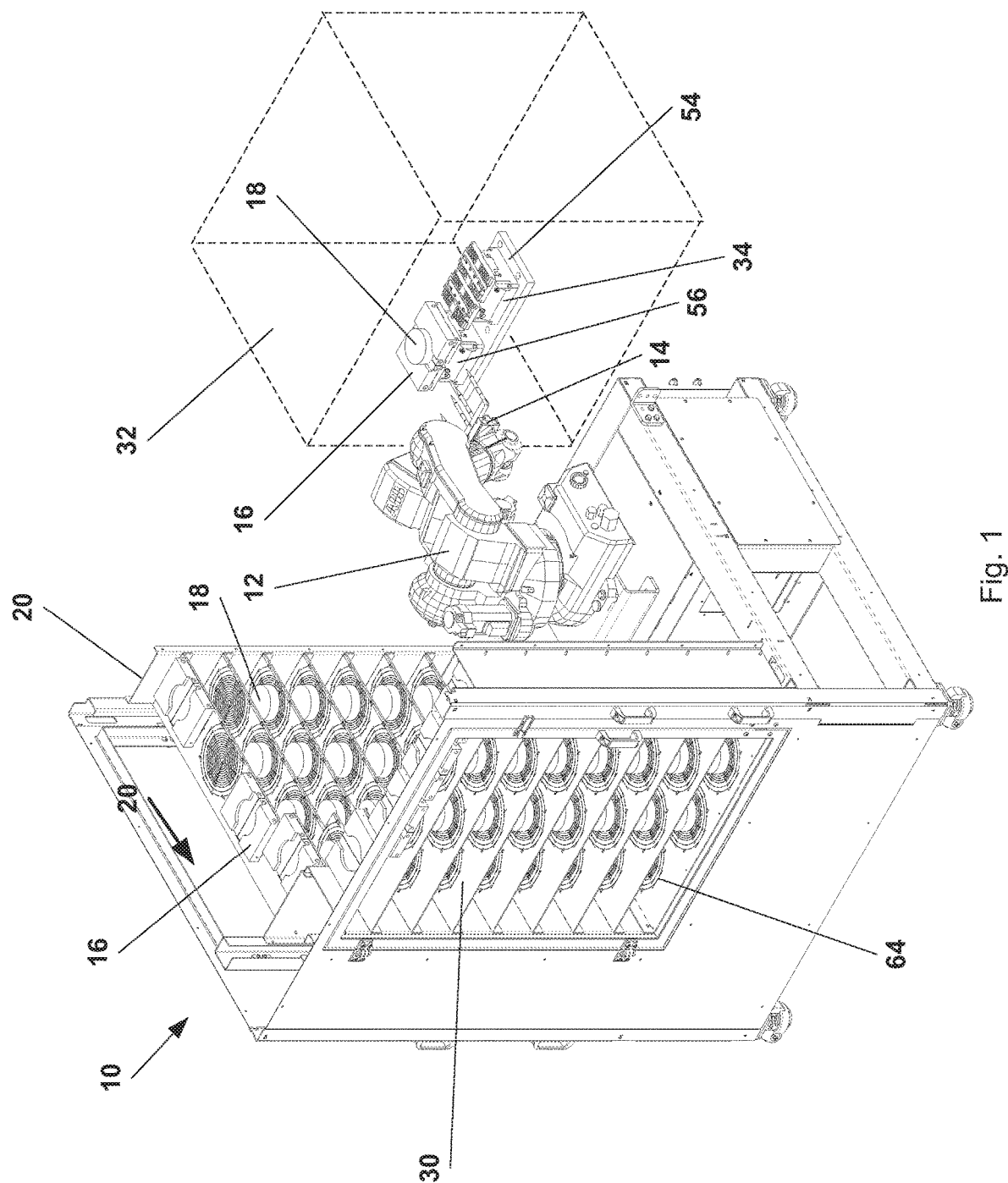
FIG. 1 is a perspective view showing the system of tending a CNC machine using a robotic arm.

Some preferred embodiments of the present invention are shown in FIGS. 1-21. As can be seen in FIG. 1, the major components of the disclosed technology include a robotic arm 12, an end of arm tool (EOAT) 14, part gripping jaws 16, a rack 20 and a CNC machine 32 with a vise 34. For clarity, robot guarding and access doors around the robot are not shown and only the CNC machine 32, table 54 and vise 34 are shown. Shown in FIG. 1 is the rack 20 and disclosed on the rack 20 are two different approaches to the method of operating the robotic CNC system which is disclosed. One method of operating the system is one in which each position in the rack 20 is occupied by an individual part 18. The positions are designated as position-for-pickup 30, and the robot arm 12 is programmed to be able to locate and engage any part 18 that is in one of the designated position-for-pickup 30. An alternative method of operation of the system and method is for a part gripping jaw 16 to be placed in every position-for-pickup 30, with a part 18 positioned on every part gripping jaw 16. In the first mode of operation, a single pair of part gripping jaws 16 would be utilized by the system to move parts 18 from the position-for-pickup 30 into engagement with the vise 34 in the CNC machine 32. In the second mode of operation, the end of arm tool 14 would engage a separate part gripping jaw 16 at each position-for-pickup 30, with the part 18 in the jaws being secured by the end of arm tool 14.

This system and method can be modified for a number of different scenarios, with the robot arm 12 being selected for the requirements of the particular job, particularly for the weight of the part 18. The parts 18 used as an example in the depicted system can be a cylindrical disc of aluminum weighing about 1 pound. For a part 18 of this general size a robot arm 12 such as an ABB IRB 140 with capability of lifting 14 pounds, would be suitable for this particular set up. For the system and method depicted, a CNC machine 32 of various styles and models can be utilized with one example being a CNC machine 32 made by Haas, model DT 1. Located inside the CNC machine is a table 54, vise 34 which engages either the part 18 or the part gripping jaws 16, depending on the particular set up, and optionally, second vise 56.

Figure 2:
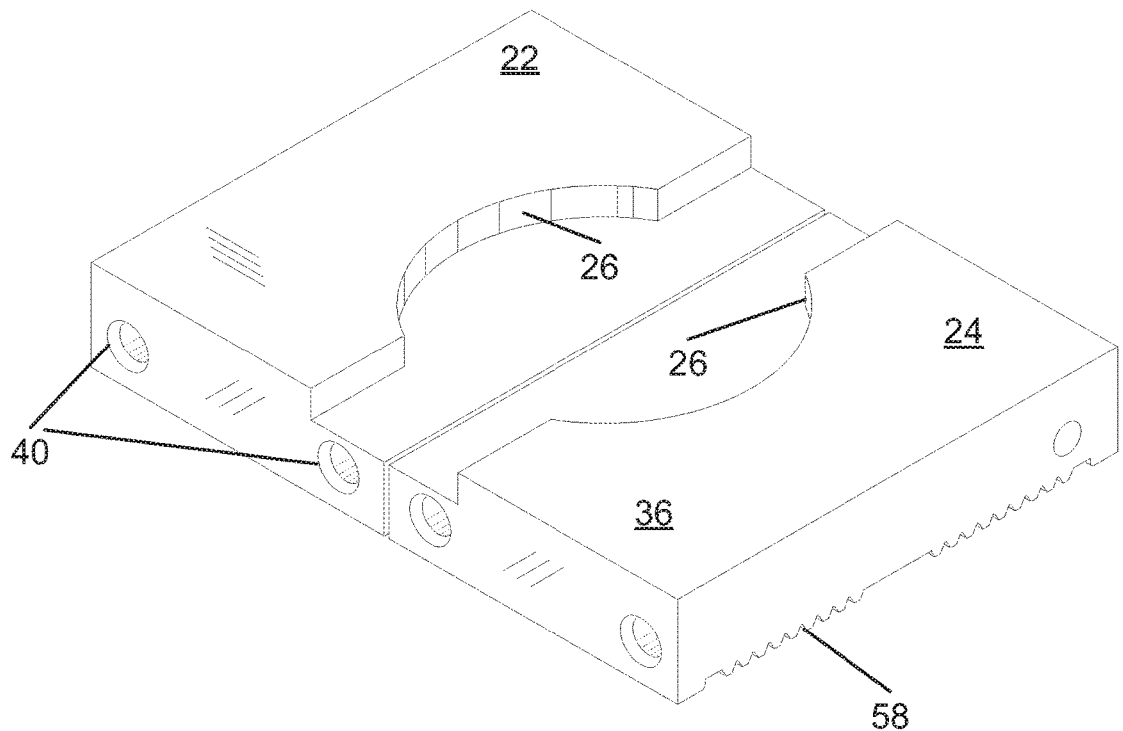
FIG. 2 is a perspective view of the top surface of a part gripping jaw.

FIG. 2 shows a closer view of a part gripping jaw 16 of the disclosed technology. Each part gripping jaw 16 has a left jaw 22 and a right jaw 24, with a top surface 36 and a bottom surface 38. The part gripping profiles 26 are machined into the top surface 36 of the part gripping jaws 16, so that moving the left jaw 22 and the right jaw 24 together can grip the outside profile of the part 18 or moving the two jaws apart can grip the inside profile of a part 18. These particular part gripping jaws 16 have internal channels 40, which are configured to interact with a certain type of EOAT 14, which has forks which fit into the internal channels 40 of this particular style of part gripping jaws 16. Other mechanisms for engaging the part gripping jaws 16 to the end of arm tool 14 are also possible, including well known mechanisms for securing and releasing objects using hydraulics or pneumatics or other methods. One such system is the Zero Point System by Jergens Workholding. The disclosed part gripping jaws 16 can be about 6 inches by 8 inches, and 1 inch thick, preferably made of aluminum, and weigh about 2 pounds.

Figure 3:
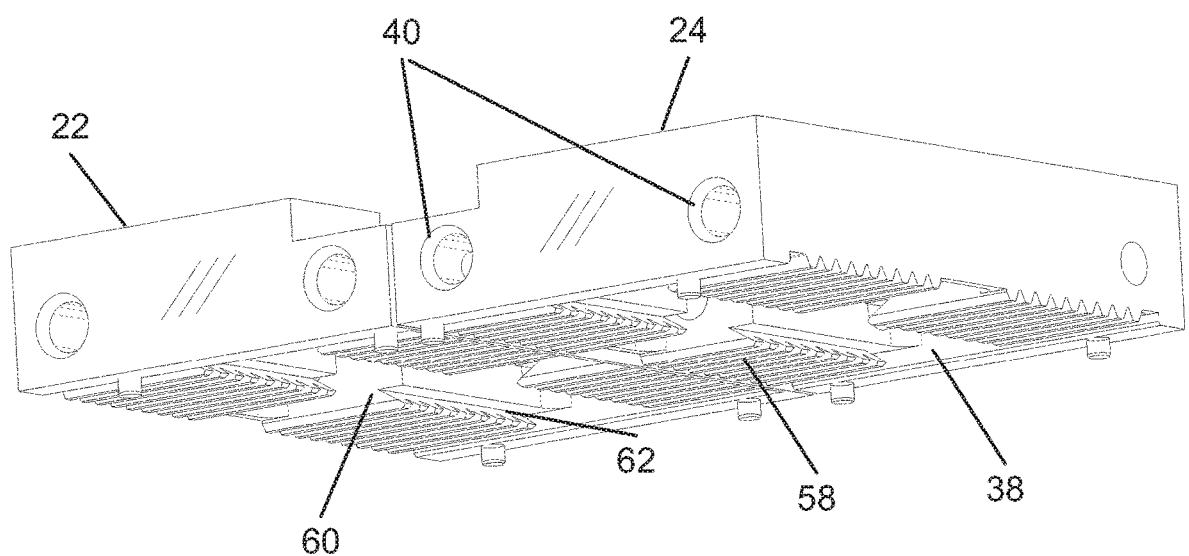
FIG. 3 is a perspective view of the bottom side of a part gripping jaw.

FIG. 3 shows the bottom surface 38 of a part gripping jaw 16, with the left jaw 22 and the right jaw 24 shown. Shown are vise engagement profiles 58, which in this case are gear-like, and made to engage similar gear-like profiles in the vise. Shown in FIG. 3 are projections 60 which have angled surfaces 62 which are engaged by the jaws of the vise 34.

Figure 4:
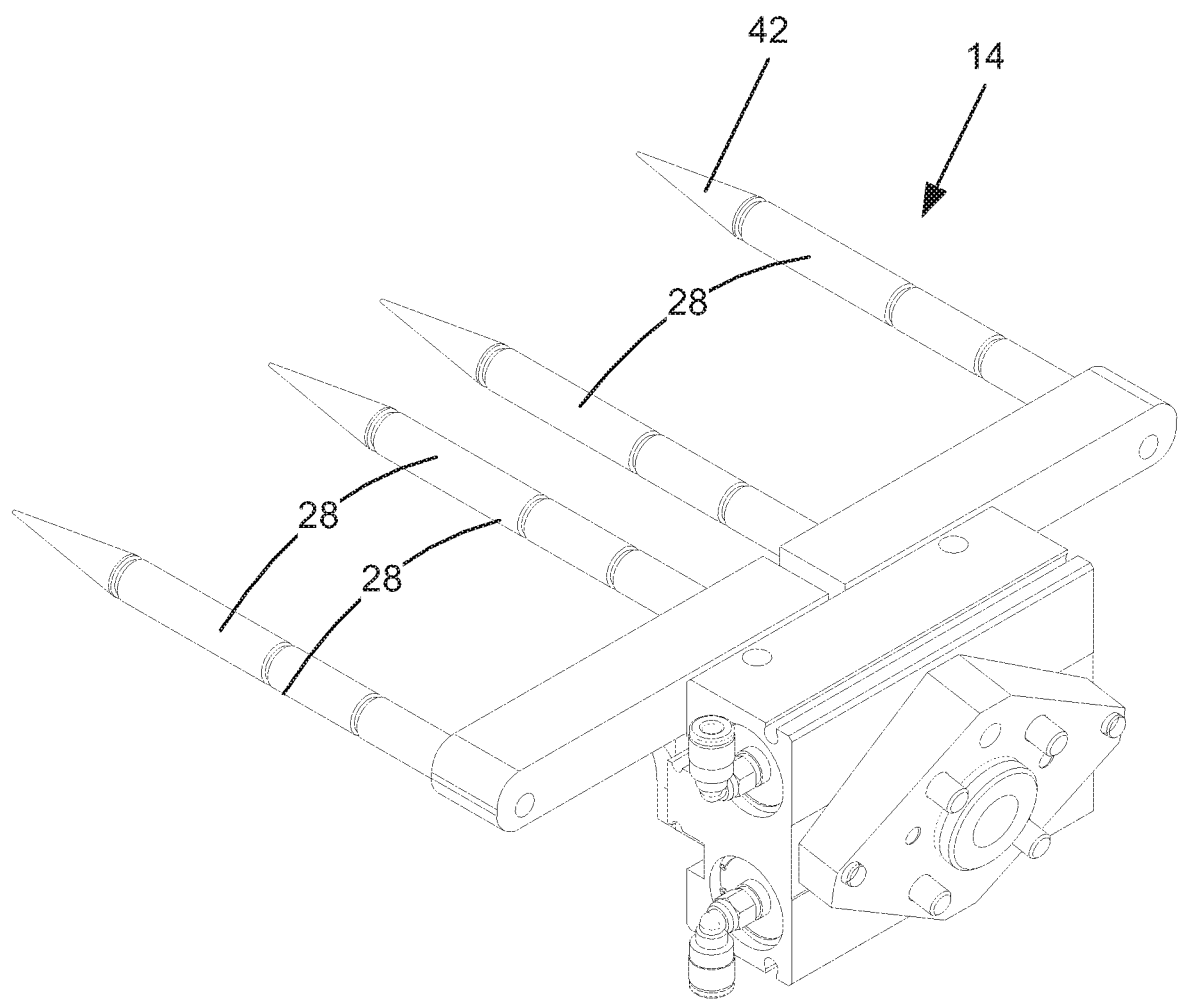
FIG. 4 is a perspective view of an End of Arm Tool.

FIG. 4 shows an End of Arm Tool (EOAT) 14 which is configured with four forks 28 which are sized to engage the part gripping jaws 16 by insertion into internal channels 40. In this particular embodiment, the forks 28 of the EOAT 14 would be approximately 5 inches long and ⅜ inches in diameter. The forks 28 on the End of Arm Tool 14 include a tip 42 which is slightly tapered, and which allows the forks 28 to self-center when entering the internal channels 40 of the part gripping jaws 16. The EOAT forks 28 can be moved to squeeze the part gripping jaws 16, by means of electronic activation of a mechanical, pneumatic, hydraulic or other means of movement.

FIG. 5 shows a vise 34 which may be used with the system and methods of the disclosed technology. Shown in FIG. 5 is a vise 34 which mounts into the CNC machine 32 or on the table 54 in the CNC machine 32. It has a top surface of vise 44 on which are located jaw engagement profiles 46 for engaging the vise engagement profiles 58 of the part gripping jaw 16, with the jaw engagement profile 46 configured for securing and immobilizing the part gripping jaws 16, so that the part 18 is held securely in place in three axes while it is being processed by various implements in the CNC machine 32. Ridges 48 are configured to engage corresponding valleys in the bottom side of the part gripping jaws 16. The ridges 48 and valleys provide a very solid connection between the two pieces, and make the two pieces with their attached part 18 react more like one solid unit of metal, against the force of the various machining tools in the CNC machine 32. The ridges 48 on the vise 34 secure the part gripping jaw 16 from movement in the Y direction as shown.

Vise jaws 50 are also shown, which secure the part gripping jaws 16 with its attached part 18 and prevents them from moving in an X and Z direction as shown. Angled surfaces 62 on the bottom surface of the part gripping jaws interact with the jaws 50 of the vise 34, so that the two sets of angled surfaces 62 interact. The jaws 50 of the vise 34 move together to engage against the corresponding projections 60 on the underside of the part gripping jaws 16, and lock it and the attached part securely in place against forces exerted by the processing tools of the CNC machine 32.

Figure 6:
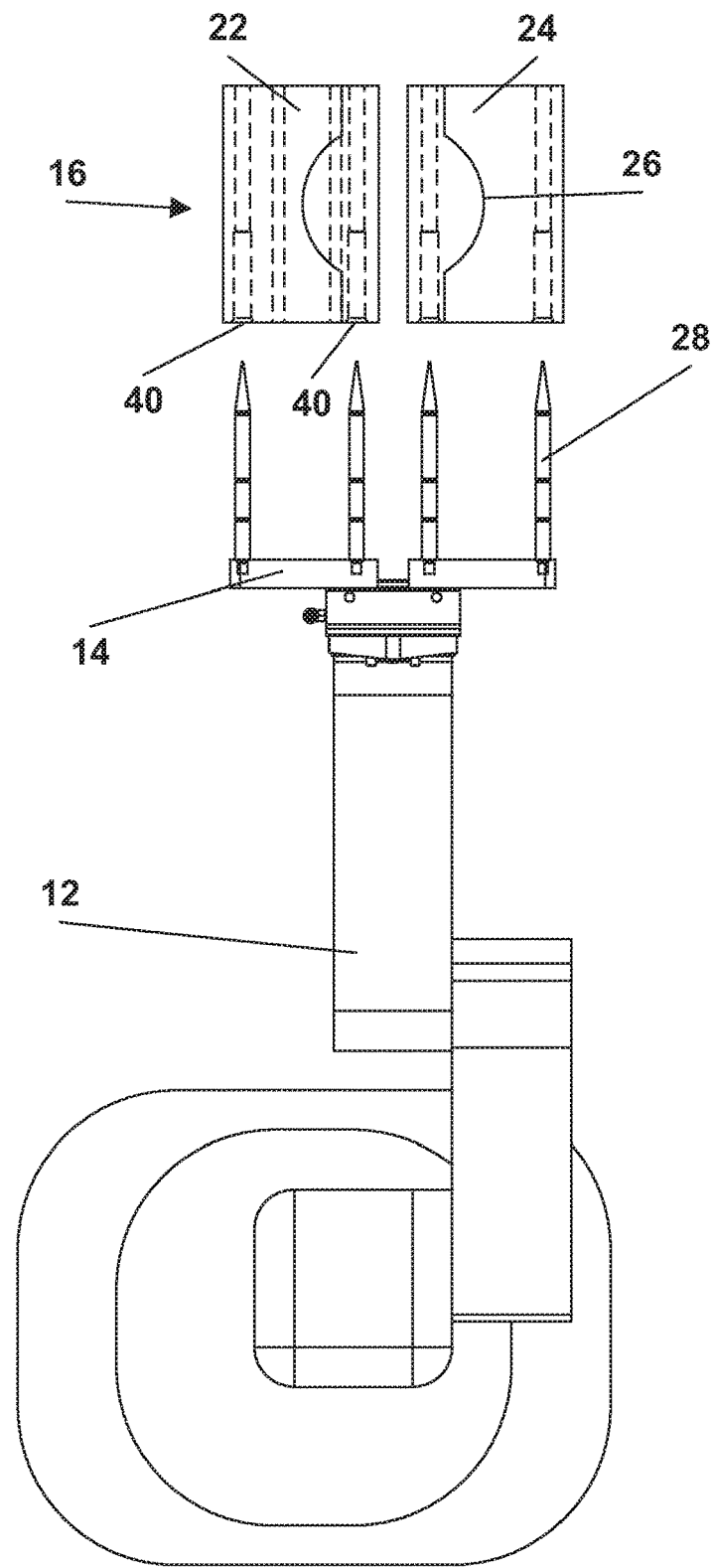
FIG. 6 is a top view of an End of Arm Tool adjacent to a part gripping jaw.

The disclosed technology includes a preferred embodiment in the form of a method which utilizes the above components to tend a CNC machine 32. FIG. 6 shows the step of providing a robotic arm 12 with an end of arm tool (EOAT) 14 configured for engagement with the left 22 and right 24 jaws of the part gripping jaw 16. The EOAT 14 is also capable of moving the left 22 and right 24 jaws together or apart in order to grip the part 18 to be processed in the part gripping profile 26. A preferred EOAT 14 may use prongs or forks 28 which fit into internal channels 40 in each of the jaws, such as two forks 28 on each side of the EOAT 14, one fork 28, or by the use of other structures which grip the left 22 and right 24 jaws and enable the EOAT 14 to move the left and right jaws 22 and 24 apart or together. A preferred embodiment of EOAT 14 utilizes four forks 28 which interfit with four internal channels 40 in the part gripping jaw 16.

Figure 7:
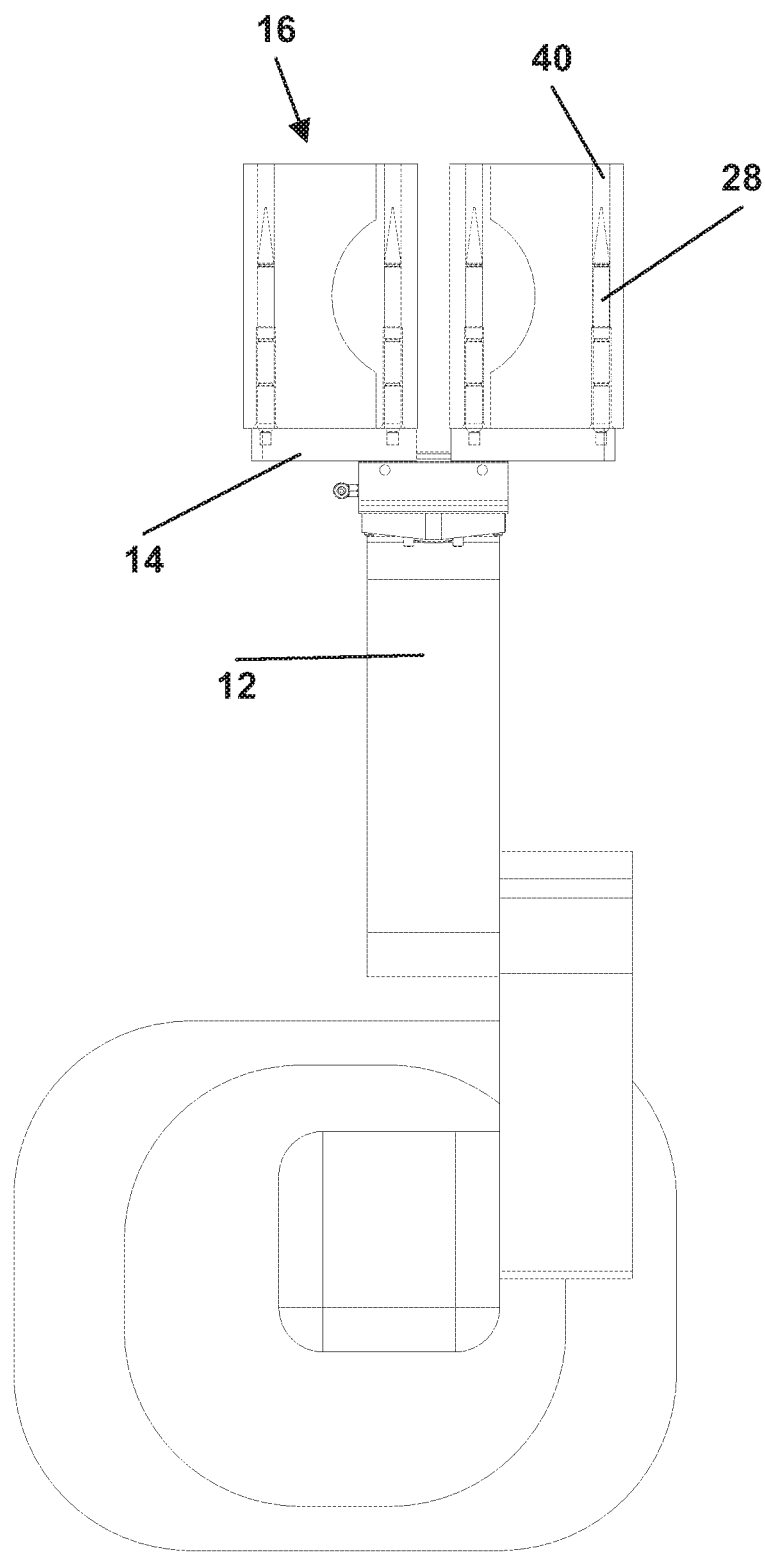
FIG. 7 is a view of the step in which the End of Arm Tool engages the part gripping jaw.
Figure 8:
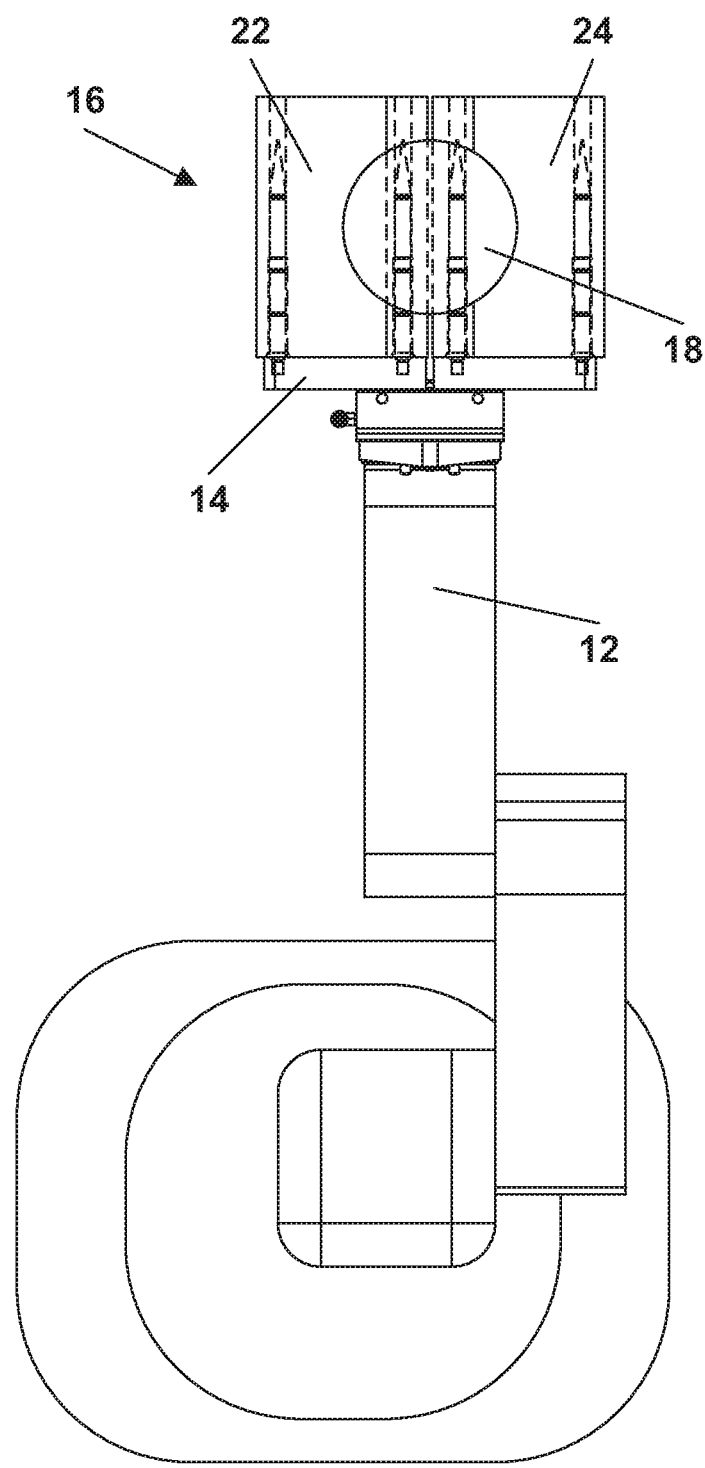
FIG. 8 is a top view of the End of Arm Tool activating the part gripping jaws to grip a part.
Figure 9:
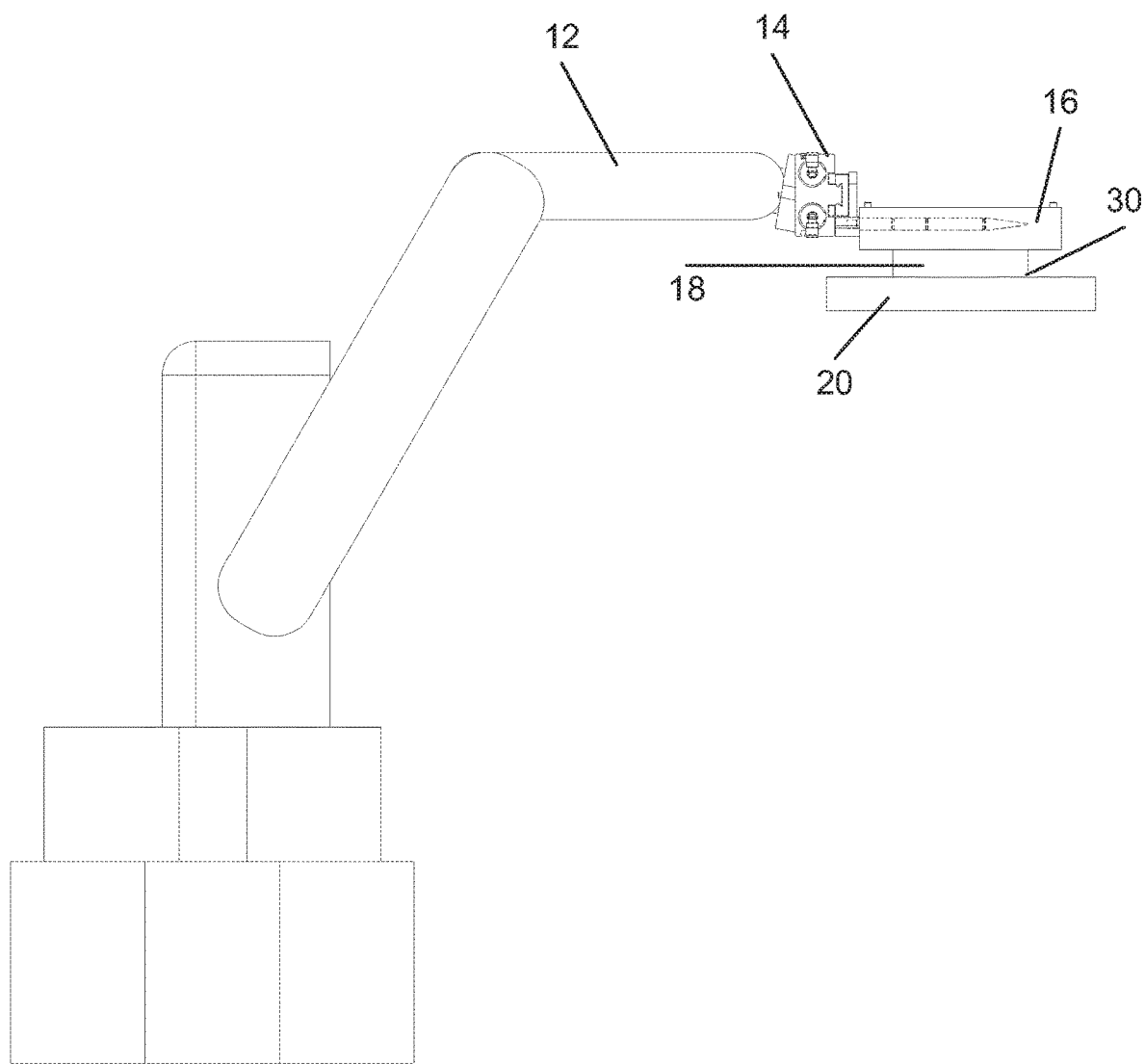
FIG. 9 is a side view of an End of Arm Tool attached to a robot arm gripping a part on a rack.

FIG. 7 shows the next step in the disclosed method, which is engaging the part gripping jaw 16 with the EOAT 14. FIG. 8 shows the step of moving the left and right jaws 22 and 24 together in this case, such as when external features of the part 18 are gripped. In the example shown in FIG. 8 the part 18 is a cylindrical disc. If internal features of the part are to be gripped, the jaws would be moved together. FIG. 9 shows the next step in the disclosed method, which is placing the part gripping jaw 16 in an inverted position over the part 18 in a position-for-pickup 30, which could be on a rack 20. FIG. 9 also shows the step of moving the left and right jaws 22 or 24 together or apart in order to grip the top section of the part 18. The jaws would be moved together to grip the outside surface of the part, and they would be moved apart to grip an inside surface of the part. Once the part 18 is gripped by the part gripping jaw 16, the next step is lifting the part 18 by movement of the robotic arm 12. The next step is inverting the part 18 and part gripping jaw 16 by the robot. The next step is moving the part 18 and part gripping jaw 16 to a position over the vise 34 in the CNC machine 32, which is shown in FIG. 10.

Figure 10:
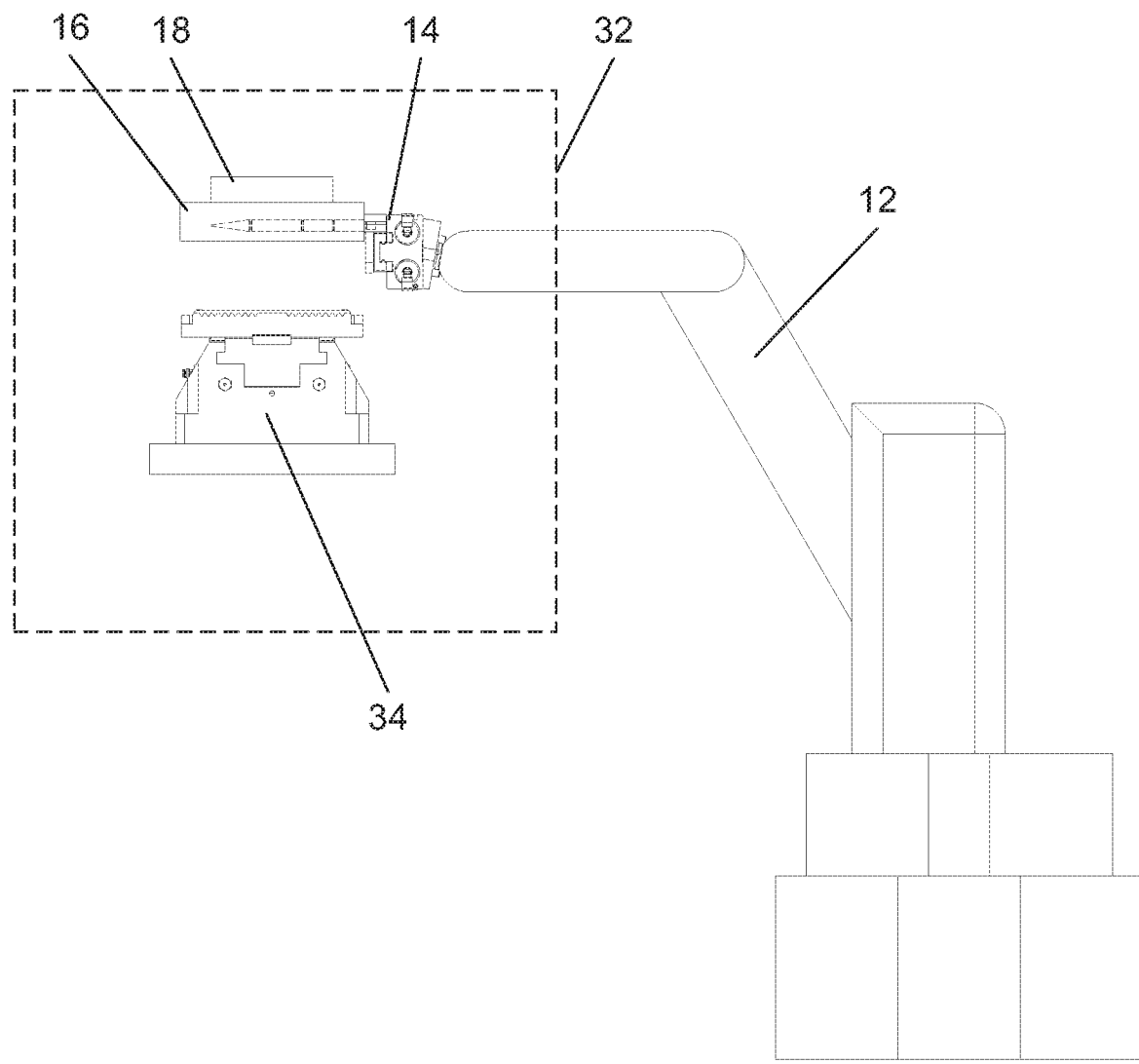
FIG. 10 is a view of the robot arm moving the End of Arm Tool into a CNC machine to place the part gripping jaw in a vise.
Figure 11:
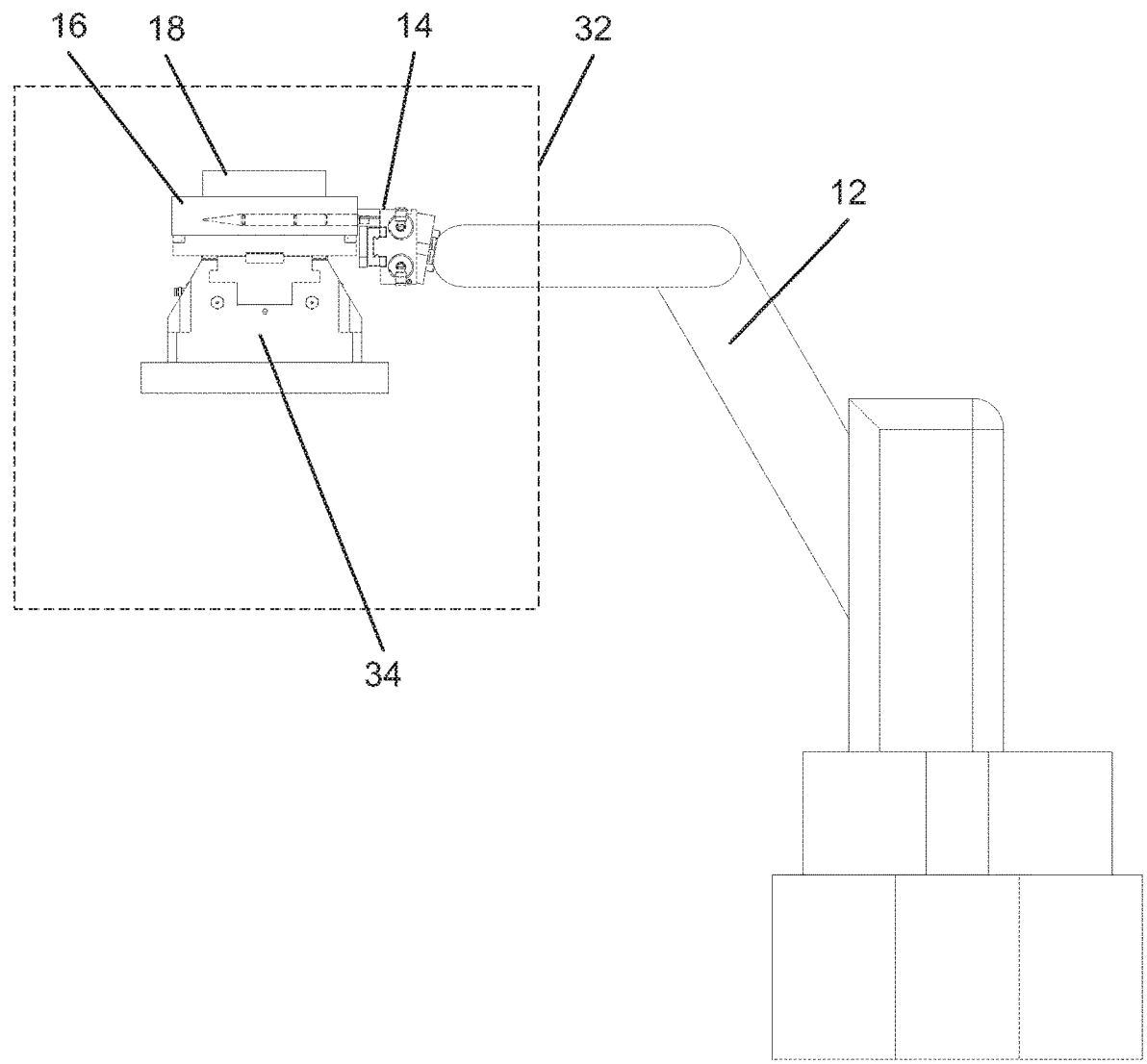
FIG. 11 is a side view of the vise securing the part gripping jaw.
Figure 12:
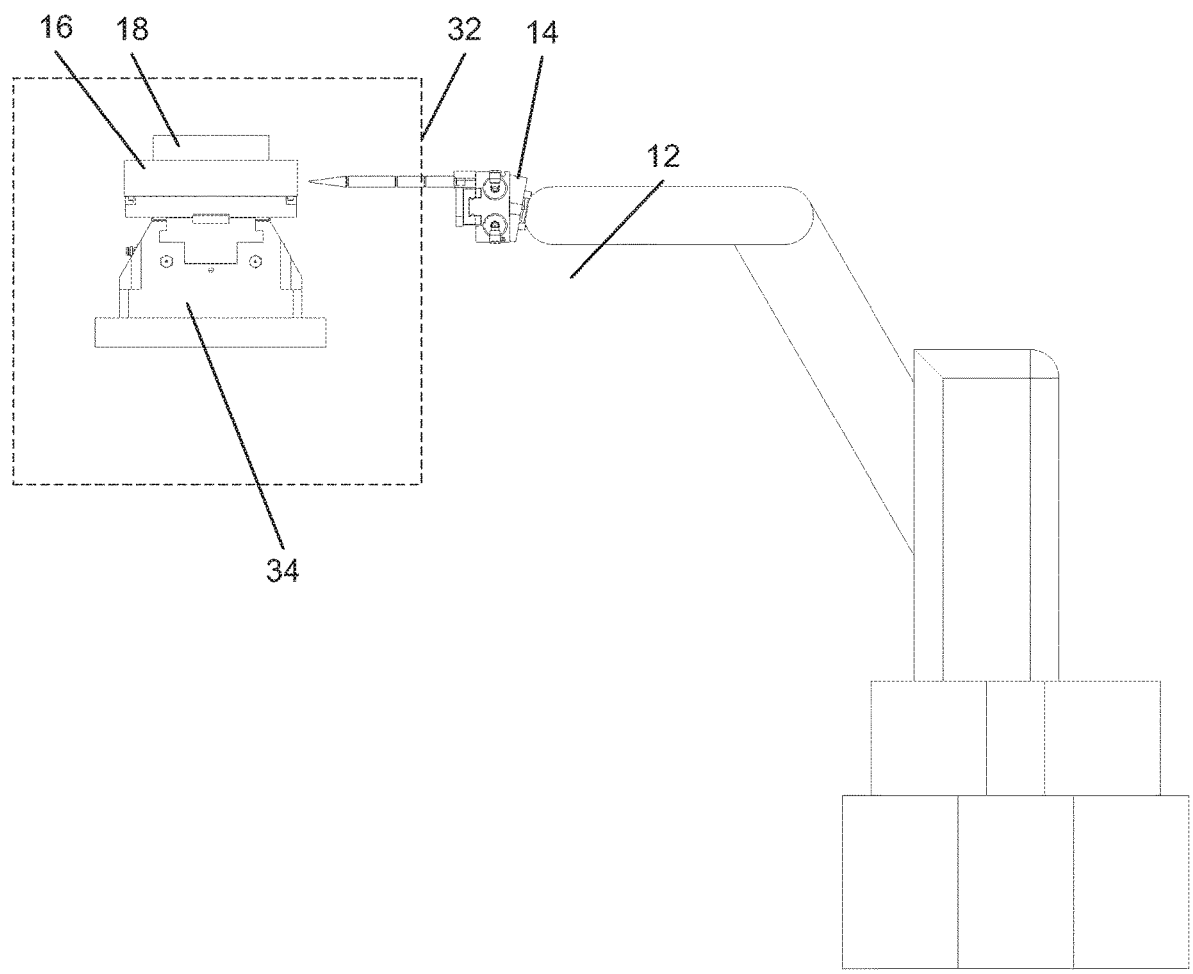
FIG. 12 is a side view of the EOAT removed from the CNC machine.

FIG. 10 shows the part gripping jaw 16 in position over the vise 34 inside the CNC machine 32. The next step is engaging the vise 34 to secure the part 18 on the part gripping jaw 16 in the vise 34, as shown in FIG. 11. The part gripping jaw 16 is secured to the vise 34 activating the vise jaws 50, which is an action which can be programmed into the machinery. FIG. 12 shows and next step of the disclosed method, in which the EOAT 14 is disengaged from the part gripping jaws 16 and removed from the CNC machine, leaving the part 18 in the CNC machine 32 for processing by a processing tool 52. Further steps in the process can include engaging the part gripping jaw 16 with the EOAT 14, as shown in FIG. 7, disengaging the vise 34 from said part gripping jaw 16, as shown in FIG. 11, removing the part gripping jaw 16 from the CNC machine by use of the robotic arm 12, as shown in FIGS. 10 and 9, and placing the now processed part 18 in a finished part position 64 (shown in FIG. 1), which could be in a rack 20 like that shown in FIG. 1.

Figure 5A:
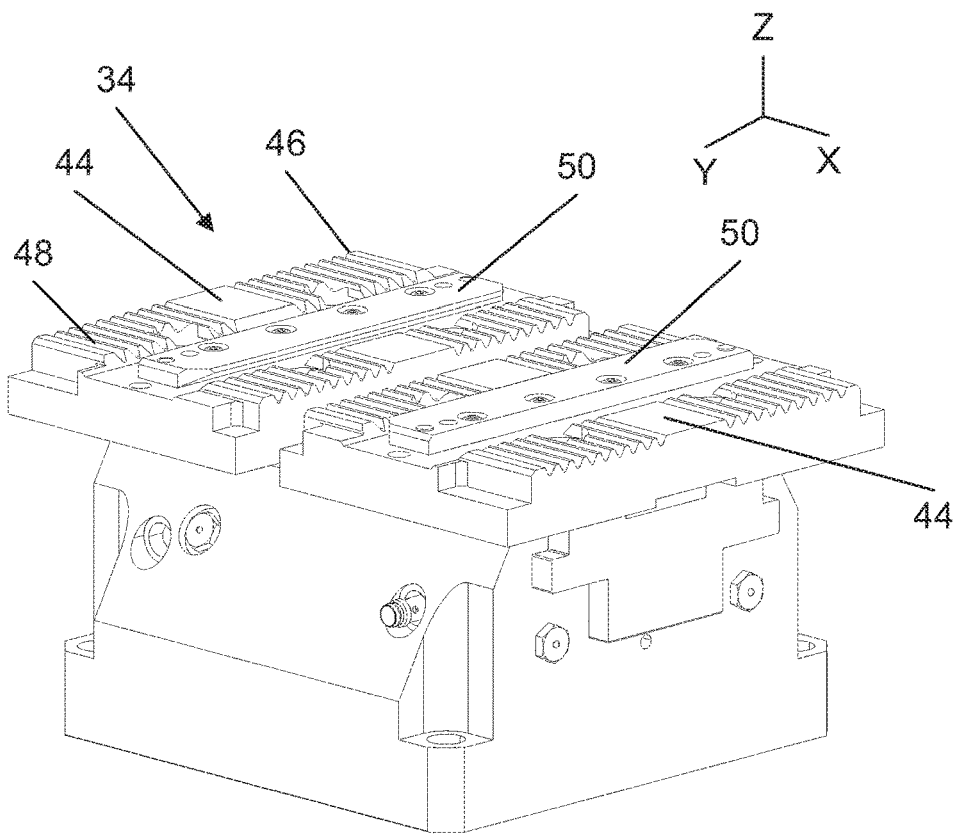
FIG. 5A is a perspective view of a vise for use in a CNC machine.
Figure 5B:
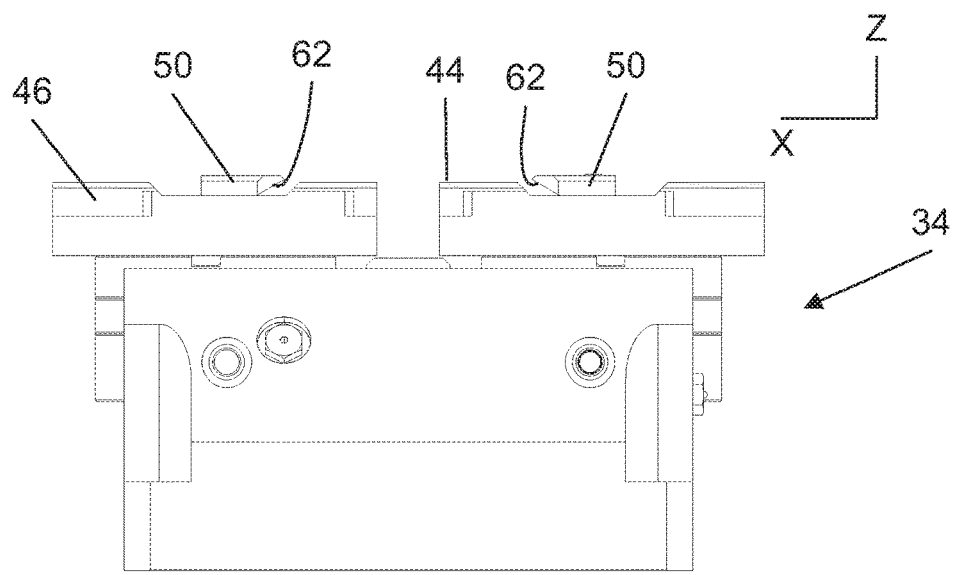
FIG. 5B is a side view of a vise for use in a CNC machine.

The step of providing a part gripping jaw 16 can include providing the part gripping jaw 16 with a vise engagement profile 58 on the bottom side 38 of the part gripping jaw 16, as shown in FIG. 3, and providing the vise 34 with a jaw engagement profile 46, on the top surface 44 of the vise 34, as shown in FIGS. 5*a* and 5*b*.

The step of engaging the part gripping jaw 16 with the vise 34 can include gripping projections 60 on the part gripping jaw 16, with vise jaws 50 on the top surface 44 of the vise 34, with as shown in FIGS. 3, 5*a*, 5*b*, and 11. This step can include engaging angled surfaces 62 on the projections 60, and on the vise jaws 50, as best shown in FIGS. 3 and 5*b*. The angled surfaces 62 on the projections 60 and on the vise jaws 50 are angled in opposite directions, so that engagement by the vise jaws 50 pulls the part gripping jaws 16 down onto the vise 34 in the Z direction, and also secures the part gripping jaw 16 from movement in the x direction. The projection can also be called a locating rail 60, and a single or multiple locating rails 60 can be utilized.

The step of providing a vise engagement profile 58 and a jaw engagement profile 46 can include the type of profile shown in the figures, which are gear-like ridges 48 and corresponding valleys. In another embodiment, the step of providing a vise engagement profile 58 and jaw engagement profile 46 is provided by a hydraulically or pneumatically securing device. One such commercially available device is the Zero Point System by Jergens Workholding Solutions. (http://www.jergensinc.com/site/showcase_zps/index.html).

Figure 14:
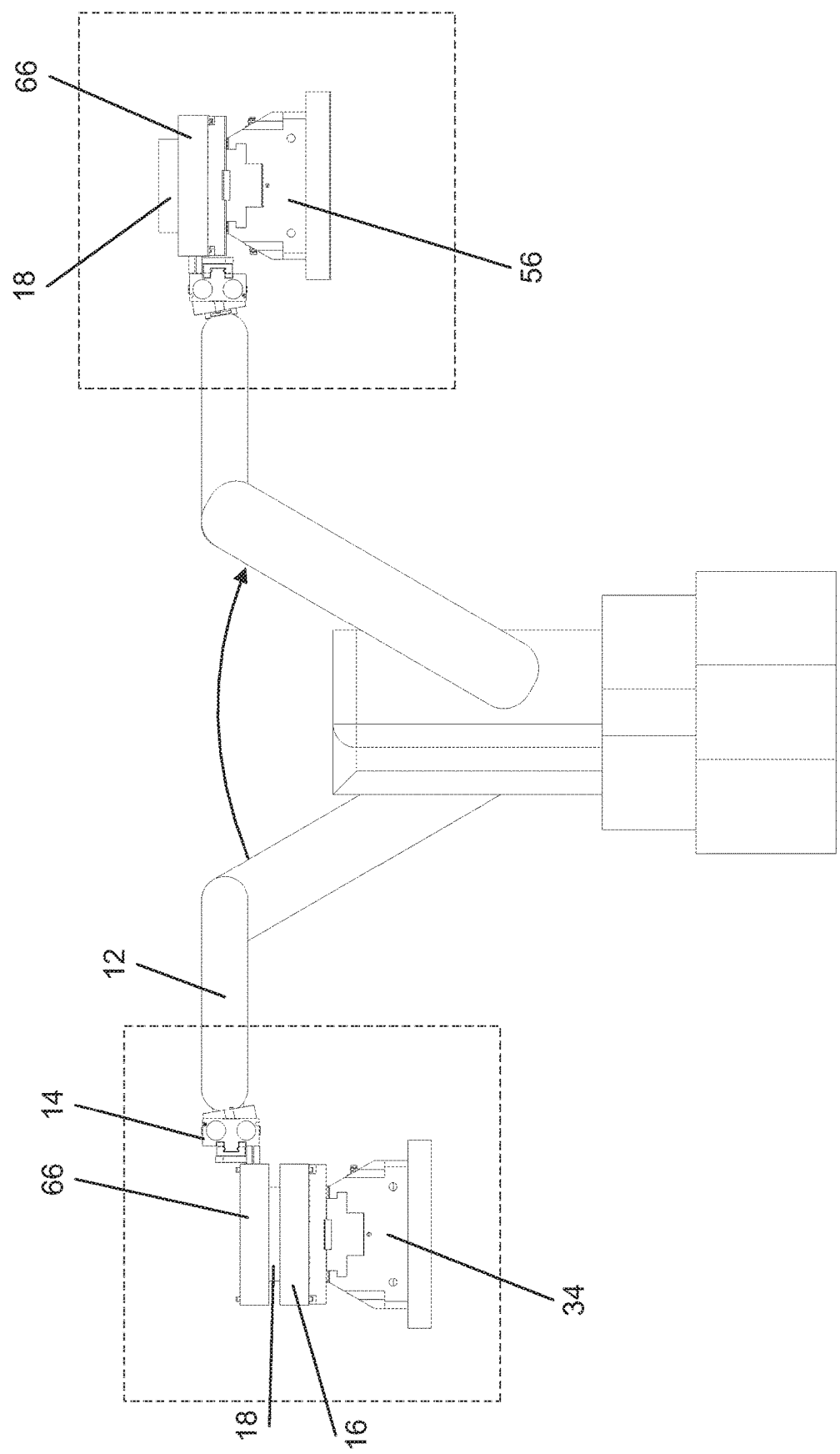
FIG. 14 is a view of the EOAT using a second part gripping jaw to grip a part and move it to a second vise.

The method described above can be augmented by adding after the step of disengaging the EOAT 14 from the vise 34, the step of engaging a second part gripping jaw 66, which would appear as shown in FIG. 7. The second part gripping jaw 66 would typically have a part gripping profile shaped to fit the form of the part 18 after a first operation of processing. The next step would be moving the second part gripping jaw 66 into engagement with the part 18 held in the part gripping jaw 16 in the vise 34, as shown in FIG. 14. The second part gripping jaw 66 is then secured on the part 18, and the vise 34 releases the part 18 by releasing the part gripping jaw 16.

Figure 13:
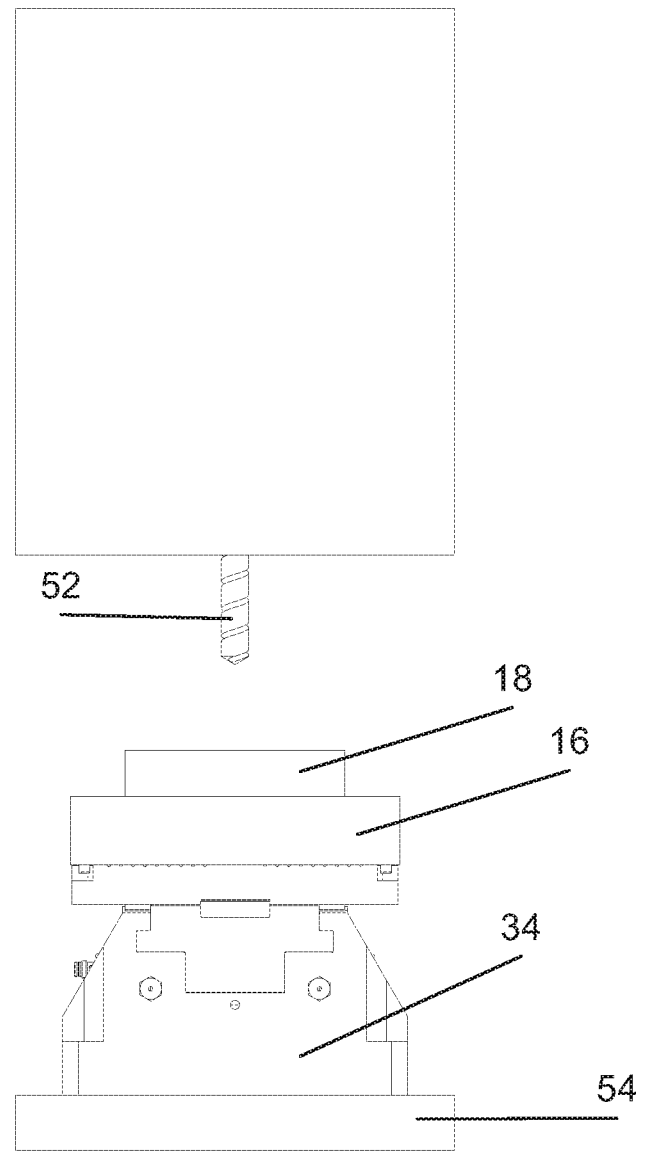
FIG. 13 is a side view of the part being processed by a tool in the CNC machine.

The next step is also shown in FIG. 14, which is moving the second part gripping jaw 66 into position with a second vise 56. After securing the second part gripping jaw 66 to the second vise 56, the EOAT 14 is removed and the part 18 is further processed in the CNC machine as shown in FIG. 13.

Another preferred embodiment is a variation of the methods above, in which after processing in the CNC machine 32, the next step is engaging the part gripping jaw 16 with the EOAT 14, disengaging the vise 34 to release the part gripping jaw 16, moving the part gripping jaw 16 and part 18 from the CNC machine 32, placing the part 18 in a finished part position 64, which can be on a rack 20 as shown in FIG. 1, and disengaging the part gripping jaw 16 from the part 18.

An alternative preferred embodiment is shown in the FIGS. 1 through 14. This method is similar to the previously described method, but includes the step of placing multiple parts 18 on multiple part gripping jaws 16, so that when the EOAT 14 engages a part gripping jaw 16, the part gripping jaw 16 is in a position-for-pickup 30 in a rack 20, with the part already in the part gripping jaws 16, as shown in FIG. 1. After engagement of the first part gripping jaw 16, the steps proceed as in the procedure discussed above. When processing of the part 18 has been completed through one or more processing cycles, it can be placed in a finished part position 64 as shown in FIG. 1.

Figure 15:
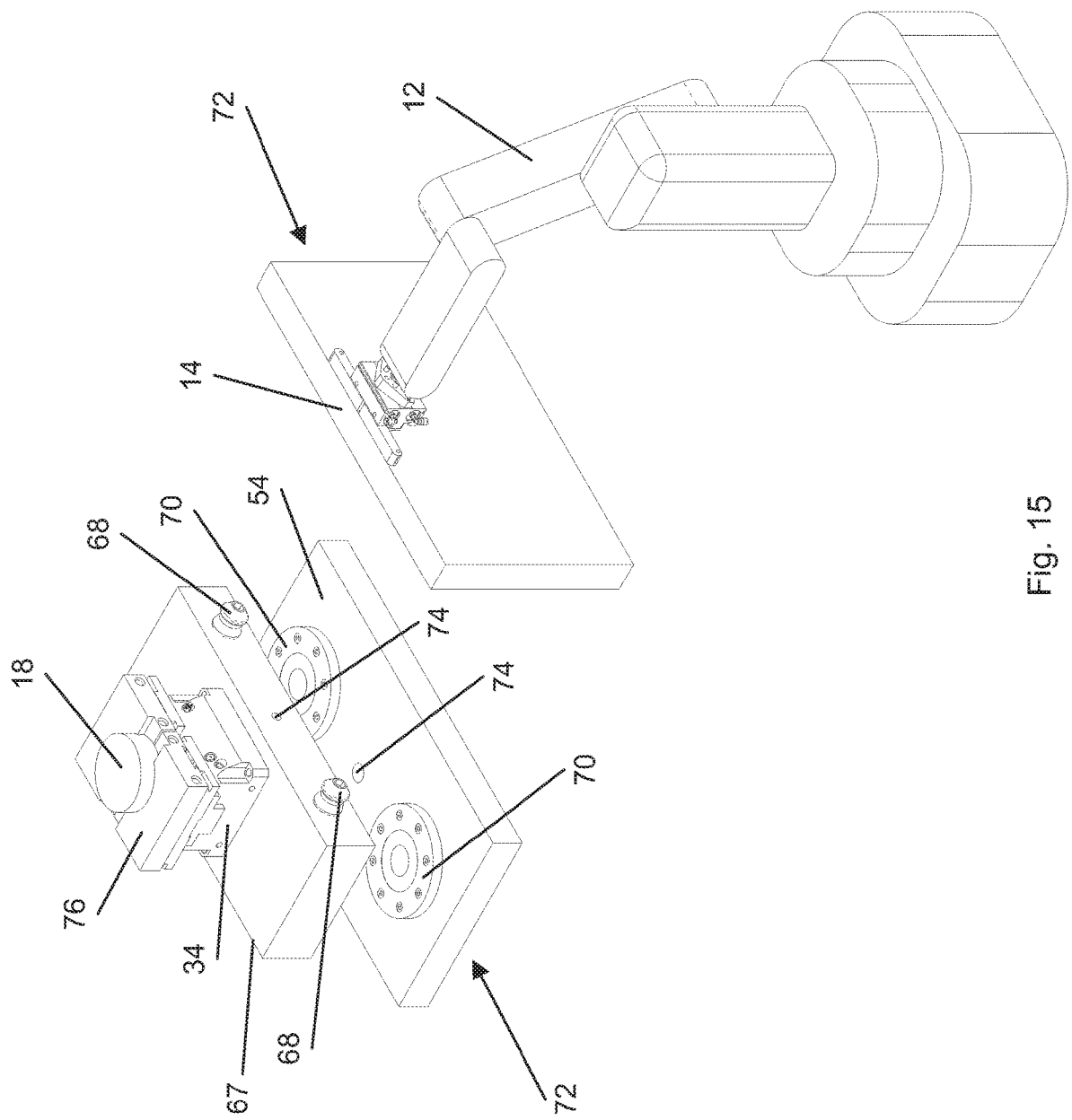
FIG. 15 is a view of the step in which the End of Arm Tool activates the part gripping jaws and secures the part in place.

The robotic arm will typically follow a sequence of commands to process each part in a job. In a preferred embodiment, the representative part requires two operations in the CNC Machine and the CNC Machine is configured with a first operation vise and a second operation vise. To begin the cycle, the operator loads the part racking system with the part's first operation jaw grippers and then secures each part to be processed in the job into the first operation jaw grippers in a first jaw rack. The operator secures the part's second operation jaws in a well-known location in a second jaw rack. The basic steps to process each part follow:

Robotic arm moves and positions the EOAT to a set of first operation jaws holding a part in the racking system Robotic arm actuates the EOAT to secure the first operation jaws and the part Robotic arm lifts and pulls the EOAT, jaws and part away from the racking system Robotic arm moves the first operation jaws and part into the CNC Machine and positioned over the first vise First vise actuates securing the first operation jaws onto the vise and the part in the jaws Robotic arm de-actuates the EOAT to release the first operation jaws Robotic arm retracts away from the first vise and out of the CNC Machine CNC Machine processes the part for the first operation Robotic arm moves and positions the EOAT to a second set of jaws in the racking system; the second set of jaws are configured to secure the part after the CNC Machine first operation process Robotic arm actuates the EOAT to secure the second set of jaws in the EOAT Robotic arm lifts and pulls the EOAT and jaws away from the racking system Robotic arm inverts the second set of jaws Robotic arm moves and positions the EOAT so that the second set of jaws are in position over the part in the first vise Robotic arm actuates the EOAT to secure the part in the second set of jaws First vise de-actuates releasing the part Robotic arm moves the second operation jaws and part away from the first vise, inverts the second operation jaws and part and precisely positions them over the second vise Second vise actuates securing the second operation jaws onto the vise and the part in the second operation jaws Robotic arm de-actuates the EOAT to release the second operation jaws Robotic arm positions in front of the first vise and actuates the EOAT to secure the first operation jaws Robotic arm retracts away from the first vise and out of the CNC Machine CNC Machine processes the part for the second operation Robotic arm positions the first operations jaws back into the racking system, de-actuates the EOAT to release the jaws on the rack and then retreats from the racking system Robotic arm moves and positions the EOAT to the second operation jaws in the second vise Robotic arm actuates the EOAT to secure the second operation jaws and the part Robotic arm signals the second vise to release Robotic arm moves the second operation jaws and part away from the second vise, retracts out of the CNC Machine, inverts the part and precisely positions the part over the first operation jaws in the racking system, gently places the part onto first operation jaws and de-actuates the EOAT to release the completed part into the first operation jaws Robotic arm retracts from the racking system, positions the second operation jaws to an available position in the racking system and de-actuates the EOAT to release the second operation jaws into the rack The entire cycle is repeated until all parts are processed A second preferred alternative embodiment is shown in FIGS. 15 and 16. In this embodiment, an EOAT 14 and CNC table 54 are configured to engage and release a vise 34 that is mounted atop a pallet 67. Both the EOAT 14 and the CNC table 54 are configured to actuate or de-actuate the vise 34 when engaged. To engage and release the vise from the EOAT 14 and CNC table 54, the ZPS system by Jergens Workholding is used. The ZPS system includes a pin 68 and a receiver 70. When the receiver 70 is actuated with pneumatic or hydraulic pressure, the pin 68 will slide into the receiver 70. When the pressure is released, a spring cam mechanism within the receiver 70 pulls the pin 68 securely into the receiver 70.

The EOAT 14 and the CNC table 54 are each configured with a ZPS receiver plate 72 containing two ZPS receivers 70. Between each ZPS on the receiver plate is at least one vise actuation port 74. The vise actuation port 74 allows the EOAT 14 or CNC table 54 to actuate and de-actuate the vise 34 when engaged. The vise 34 is securely mounted to a plate having ZPS pins 68 for engaging the EOAT 14 and ZPS pins 68 for engaging the CNC table 54. Between each ZPS pin 68 is a vise actuation port 74 configured to engage with the vise actuation port 74 on the EOAT or CNC table receiver plate. The vise may be configured with jaws 76 for part pickup 18.

In this configuration the robot arm 12 positions the EOAT 14 into engagement with the vise 34 and actuates the ZPS receivers 70 to secure the vise 34. The robot arm 12 then positions the vise 34 over a part 18 in a pickup location 30. The EOAT 14 actuates the vise 34 via the vise actuation port 74 to secure the part 18 in the vise 34. The robot arm 12 the moves the vise 34 into engagement with the CNC table 54 ZPS receivers 70 and actuates to the CNC table 54 ZPS receivers 70 to secure the vise 34. The robot arm 12 then de-actuates the EOAT 14 ZPS receivers 70 to release the vise 34. The robot arm 12 moves away and the CNC machine 32 processes the part.

This second preferred alternative embodiment utilizes a robot EOAT to transfer a vise that can engage and release a part between a part pickup location and a CNC machine. One skilled in the art can readily see that this system can be used in place of the part gripping jaws and vise to perform the same methods previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A part gripping device to retain a workpiece for processing it in a workstation located in a CNC machine and for repositioning it with a robotic tender, the workpiece defining longitudinal workpiece axis and including first and second workpiece sides, the first and second workpiece sides forming opposing ends of the workpiece and having corresponding first and second workpiece surface portions that are perpendicular to the longitudinal workpiece axis, the part gripping device comprising:

a first side inducing a first mechanical coupling for an end of arm tool of the robotic tender configured to engage and release (i) in one instance, the part gripping device and (ii) in another instance, the workpiece with the part gripping device at a location away from the workstation located in the CNC machine;

a second side, different from the first side, including a second mechanical coupling for an actuatable workstation fastener that is operatively coupled to the CNC machine and is configured to restrain the part gripping device at the workstation; and a third side, perpendicular to the first side and different from the second side, defining a part gripping surface by which to confront and engage the first workpiece side and thereby unobstructedly present the second workpiece side for processing the second workpiece side in the workstation located in the CNC machine.

2. The part gripping device of claim 1, in which the second side is opposite the third side.

3. The part gripping device of claim 1, in which the actuatable workstation fastener comprises a vise operatively coupled to the CNC machine, and the second mechanical coupling of the second side comprises a vise engagement profile mechanically couplable to a complementary surface profile of the vise.

4. The part gripping device of claim 3, in which the vise engagement profile includes ridges of a vise jaw, and, in response to actuation of the vise in a direction transverse relative to the longitudinal workpiece axis, the vise engagement profile restrains, in three axes, relative movement of the part gripping device with respect to the vise.

5. The part gripping device of claim 1, further comprising:
a vise; and
in which the first mechanical coupling comprises:
a set of pins matable with a corresponding set of pin-receiver apertures of the EOAT for restraining relative movement between the part griping device and the EOAT when it is engaged with the part gripping device; and
a vise actuation port through which the vise is actuatable from the robotic tender.

6. The part gripping device of claim 5, in which the set of pins form a zero point mounting system with the corresponding set of pin-receiver apertures of the EOAT.

7. The part gripping device of claim 5, further comprising a pallet on which the vise is mounted, the pallet including the first and second mechanical coupling and thereby defining, respectively, the first and second sides.

8. The part gripping device of claim 7, in which the second mechanical coupling comprises a set of pins matable with a corresponding set of pin-receiver apertures of a CNC table, and the actuatable workstation fastener comprises the corresponding set of pin-receiver apertures.

9. The part gripping device of claim 7, in which the vise actuation port comprises a first vise actuation port, and in which the pallet includes a second vise actuation port through which the vise is actuatable from the CNC machine, the second vise actuation port having an opening included in the second side.

10. The part gripping device of claim 5, in which the vise includes first and second vise jaws, the part gripping device further comprising:
first and second part gripping jaws matable with, respectively, the first and second vise jaws; and
a pallet defining the first and second sides and providing a mounting surface, opposite the second side, on which the vise is mounted to define the third side.

11. The part gripping device of claim 1, further comprising a vise actuation port having an opening included in the first side and positioned to engage a complementary port having an opening included in the EOAT of the robotic tender.

12. The part gripping device of claim 1, further comprising a vise actuation port having an opening included in the second side and positioned to engage a complementary port having an opening included in a CNC table of the CNC machine.

13. The part gripping device of claim 1, further comprising a set of vise actuation ports including a first vise actuation port having an opening in the first side and a second vise actuation port having an opening in the second side.

14. The part gripping device of claim 13, in which the second side is opposite the third side.

* * * * *